United States Patent [19]
Dieterich

[11] Patent Number: 5,280,355
[45] Date of Patent: Jan. 18, 1994

[54] TELEVISION DEGHOSTING APPARATUS USING PSEUDORANDOM SEQUENCE DETECTOR

[75] Inventor: Charles B. Dieterich, Kingston, N.J.

[73] Assignee: RCA Thomson Licensing Corporation, Princeton, N.J.

[21] Appl. No.: 869,310

[22] Filed: Apr. 16, 1992

[51] Int. Cl.$^5$ ............................................. H04N 5/21
[52] U.S. Cl. .................................... 358/167; 358/905
[58] Field of Search ............... 358/905, 167, 187, 147, 358/36, 188; H04N 5/21

[56] References Cited

U.S. PATENT DOCUMENTS

| | | | |
|---|---|---|---|
| 4,542,408 | 9/1985 | Lewis, Jr. ........................ | 358/905 X |
| 4,980,767 | 12/1990 | Chao et al. ...................... | 358/905 X |
| 5,060,067 | 10/1991 | Lee et al. ........................ | 358/905 X |
| 5,065,242 | 11/1991 | Dieterich et al. ................. | 358/167 |

Primary Examiner—Victor R. Kostak
Attorney, Agent, or Firm—Joseph S. Tripoli; Eric P. Herrmann; Ronald H. Kurdyla

[57] ABSTRACT

Apparatus for detecting the presence of a pseudorandom number (PRN) sequence used in a television receiver for reducing multipath interference such as image ghosts includes a multiplier responsive to a video signal containing the PRN sequence test signal component, and to a delayed version of such video signal. The amount of the delay is related to the duration of a PRN sequence, and one of the multiplier inputs is substantially devoid of average and DC components. A multiplier output representing correlation of the input signals indicates the presence of the test signal component, which is then passed to a network for processing to develop coefficients for a deghosting filter.

13 Claims, 3 Drawing Sheets

TELEVISION DEGHOSTING APPARATUS USING PSEUDORANDOM SEQUENCE DETECTOR

FIELD OF THE INVENTION

This invention concerns apparatus for removing multipath distortion from video signals.

BACKGROUND OF THE INVENTION

Many systems have been developed for removing multipath distortion from video signals. In the context of television signal processing, such systems are commonly referred to as deghosting systems. In general these systems employ techniques at a receiver for comparing a received test signal with an ideal version of the test signal in order to configure an adaptive filter to remove multipath components from the received signal.

One deghoster system, described in U.S. Pat. No. 5,065,242-Dieterich et al., advantageously incorporates a repetitive pseudorandom number sequence in a transmitted televison signal. Specifically, a pseudorandom sequence training signal is incorporated in a horizontal line within a vertical blanking interval of a broadcast television signal. A received training signal, after initial processing, is transformed via fast Fourier transform (FFT) apparatus, deconvolved with an FFT of a non-corrupted locally provided version of the training signal, and processed for generating coefficients for a multipath correction filter.

SUMMARY OF THE INVENTION

In accordance with the principles of the present invention it is herein recognized as desirable to reliably detect the presence of a training signal of the type incorporating a pseudorandom number sequence, for example. In accordance with the principles of the present invention a correlator receives a video signal containing the training signal component, and a delayed version of such video signal. The amount of the delay is approximately equal to a pseudorandom number sequence interval. The presence of a pseudorandom sequence causes the correlator output to exceed a threshold, whereby the video signal portion (e.g., line) containing the pseudorandom sequence is selected for processing to develop coefficients for configuring a filter so as to cancel multipath effects such as image ghosts.

In one illustrated preferred embodiment a video signal input to the correlator (a multiplier) has had the average component removed, and the correlator output is integrated prior to being processed by a comparator.

DETAILED DESCRIPTION

Figure 1:
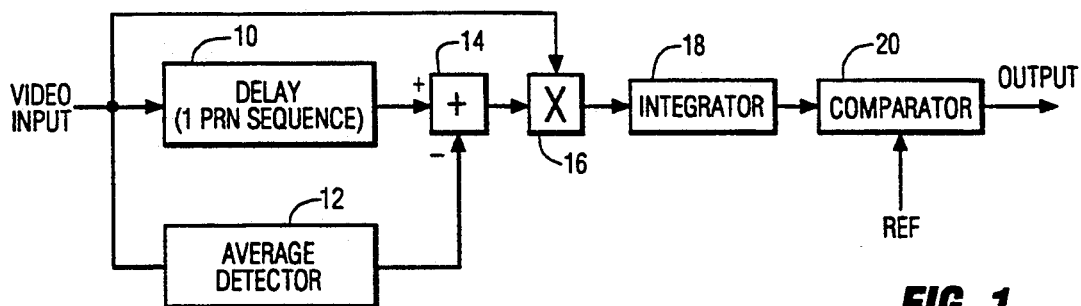
FIGS. 1, 3 and 4 depict embodiments of apparatus according to the present invention.
Figure 2:
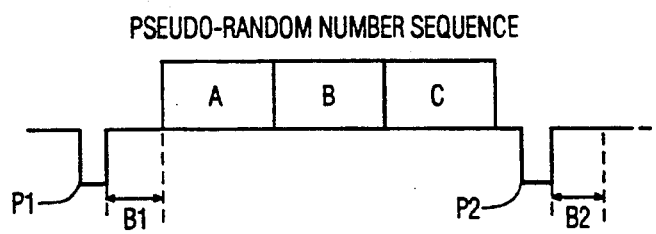
FIG. 2 is a waveform helpful in understanding the operation of apparatus according to the invention.

In FIG. 1 a video input signal derived from a received television signal includes image information during image intervals, and a training signal, i.e., a test signal. The test signal is disposed in a predetermined horizontal line in the vertical blanking interval and comprises a three repetition pseudorandom number (PRN) sequence. Such a test signal is described in detail in aforementioned U.S. Pat. No. 5,065,242, which is incorporated herein by reference, and is illustrated generally in FIG. 2. The test signal shown in FIG. 2 includes a sequence of three 256 sample pseudorandom number sequences A, B and C during the active portion of a horizontal line interval in the vertical blanking interval, between successive horizontal blanking "back porch" intervals B1 and B2 and associated sync pulses P1 and P2. Being similar, sequences A, B and C exhibit high mutual correlation.

Figure 3:
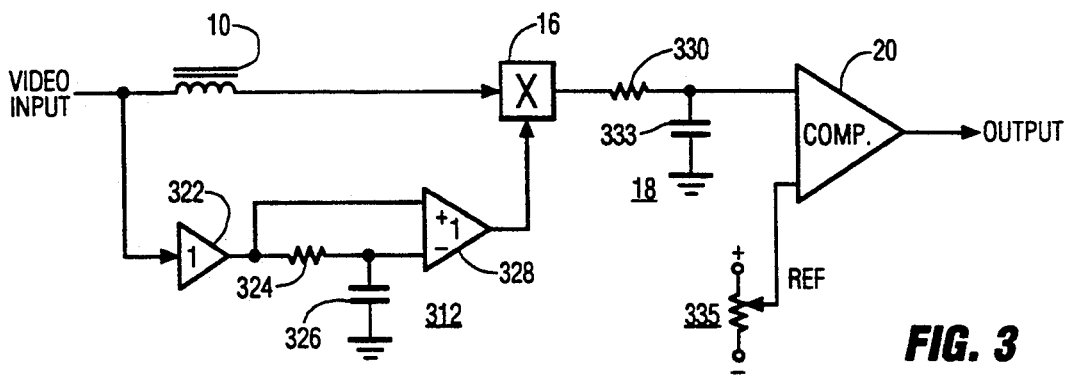
Figure 4:
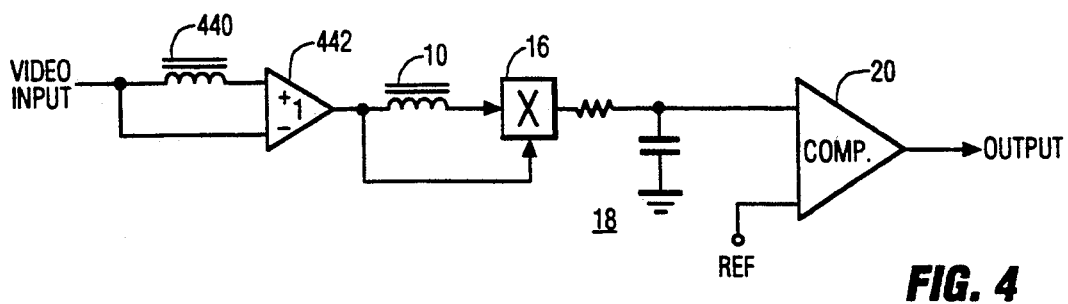

In the FIGS. 1, 3 and 4 embodiments similar elements are identified by the same reference numbers. In FIG. 1 the input video signal including the PRN test signal is applied to a delay unit 10 and to an average detector 12, the outputs of which are applied to summing (+) and subtracting (−) inputs of a combiner 14, i.e., a differencer. The delay exhibited by unit 10 substantially equals the time interval of one PRN sequence, approximately 18.9 microseconds in this example, and detector 12 exhibits a time constant of approximately 1 microsecond. Unit 12 detects the average level and the DC component of the video signal, so that the difference signal output of difference 14 represents the difference between delayed video and the detected average level. That is, the output signal from differencer 14 is substantially devoid of average video signal information including DC.

The input video signal and the output video signal from combiner 14 are applied to a multiplier 16 which provides an output signal representing the correlation between the two input signals. A large output signal from multiplier 16 represents relatively high input signal correlation. The output signal from multiplier 16 is integrated by a unit 18 with a time constant of approximately 30 microseconds. The output signal from integrator 18 is compared to a reference level REF by means of a comparator 20. If threshold level REF is exceeded, indicating significant correlation between the input signals applied to multiplier 16, an OUTPUT signal representing such condition is generated by comparator 20. Thus the presence of the test signal with PRN sequences is detected. The OUTPUT signal is used to enable the processing of the test signal for ghost reduction purposes, as will be explained in connection with FIG. 6.

Correlation may be determined as between test signal PRN sequences A and B, with the average detecting function performed with respect to sequence A. Correlation also may be performed with respect to other combinations of the PRN sequences, e.g., B and C.

The arrangement of FIG. 1, and the arrangements of FIGS. 3 and 4 to be discussed, may be implemented in analog or digital form. The arrangements could operate continuously with R-C type time constants, or they could operate on a synchronized basis whereby the average detector is reset at the beginning of each test signal line with the average being computed over the first 256 samples at a 14.32 MHz rate for a PRN sequence interval of 18.9 microseconds. In such case, for example, correlation is performed as between sequences A and B with average detection being performed over sequence A.

The video input signal applied to delay 10 and to average detector 12 may be low pass filtered to less than the 4.2 MHz channel bandwidth (in an NTSC system), e.g., to 2.5–3.0 MHz, to permit the use of a less accurate delay in unit 10. Also, the delay provided by unit 10 may correspond to two PRN sequence intervals, i.e., 512 samples at a 14.32 MHz rate, whereby unit 10 would provide a delay of approximately 37 microseconds. In addition, integrator 18 need not integrate over a full horizontal line interval.

In the arrangement of FIG. 3, the video input signal after being delayed by unit 10 is applied directly to an input of multiplier 16. The other input of multiplier 16 receives an output signal from an average detection and differencing network 312. Specifically, the video input signal is coupled via a unity gain buffer amplifier 322 to an average responding RC network including a resistor 324 and a capacitor 326. A unity gain differential amplifier 328 provides an output signal representing the difference between the video signal at the output of buffer 322, and the voltage developed by circuit elements 324 and 326. The output video signal from unit 328 is substantially devoid of average and DC components. Integrator 18 is shown as comprising a resistor 330 and a capacitor 333, and reference voltage REF for comparator 20 is provided by a potentiometer 335.

In the arrangement of FIG. 4, the video input signal is DC coupled via a short delay 440, of approximately 1 microsecond, to a noninverting (+) input of a unity gain differential amplifier 442. The inverting (−) input of amplifier 442 receives the video input signal directly. By virtue of short delay element 440 and differencer 442, the average and DC components are substantially eliminated from the output signal of differencer 442. Multiplier 16 responds to the output signal from differencer 442 directly, and to such output signal after being delayed by unit 10.

Figure 5:
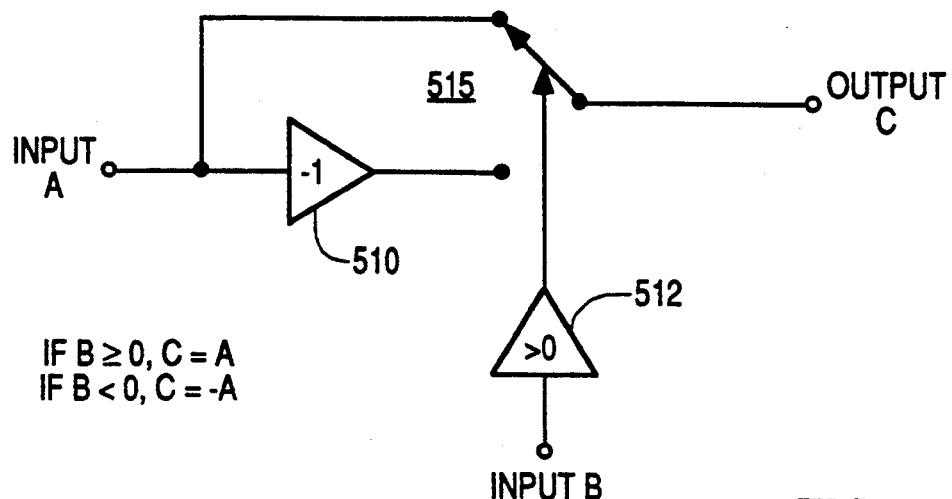
FIG. 5 shows an alternative form of an element of the apparatus of FIGS. 1, 3 and 4.

FIG. 5 depicts a circuit which may be used for multiplier 16. First and second input signals A and B are respectively coupled to an amplifier 510 with negative unity gain, and to an amplifier 512 with a predetermined gain greater than zero. Inputs of an electronic switch 515 respectively receive first input signal A directly, and the output signal from unit 510. The position of switch 515 is determined by the output signal from unit 512. Switch output signal C corresponds to input signal A if the magnitude of signal B is greater than or equal to zero. Switch output signal C corresponds to a negative version of input signal A if the magnitude of signal B is less than zero. Output signal C may be employed as an indicator of the correlation between the input signals. The arrangement of FIG. 5 and a conventional multiplier are both controlled nonlinear devices which produce a product-like output in response to two inputs, one of which controls the transfer function.

Figure 6:
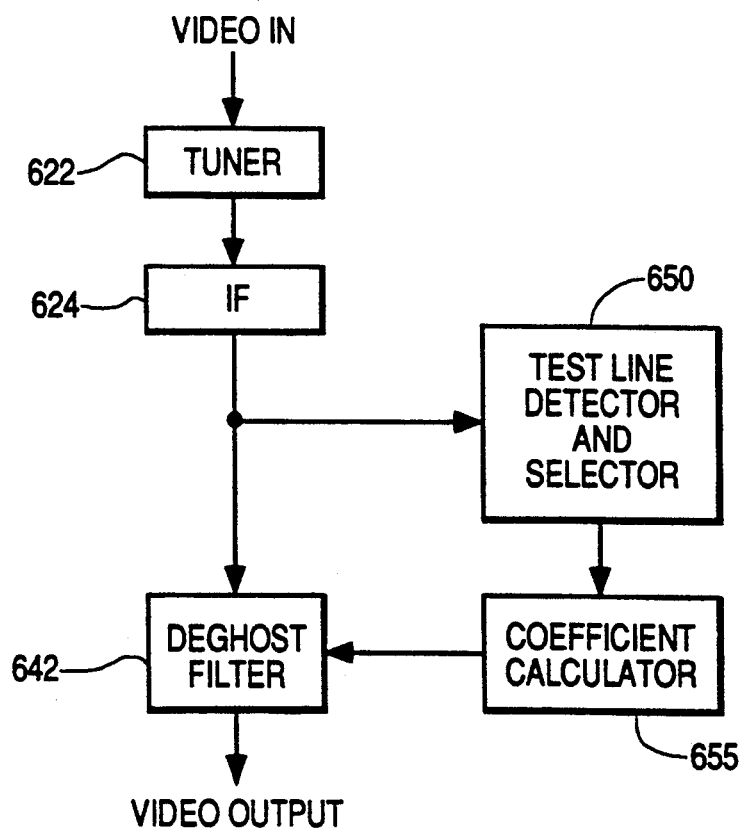
FIG. 6 is a block diagram of a portion of a television receiver for performing image deghosting in association with apparatus according to the present invention.
Figure 7:
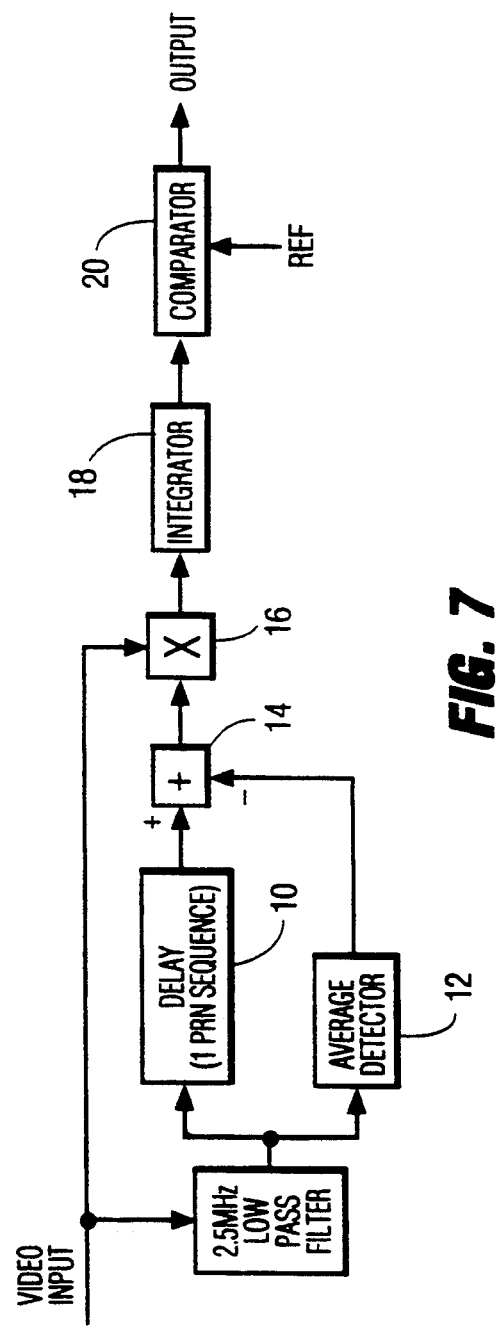
FIG. 7 illustrates a modification of the FIG. 1 apparatus.

The block diagram of FIG. 6 represents a portion of a television receiver including signal deghosting apparatus. With the exception of test line detector and selector unit 650, the arrangement of FIG. 6 is described in detail in aforementioned U.S. Pat. No. 5,065,242. An input video signal is processed by a conventional tuner 622 and intermediate frequency (IF) processor 624 for producing a detected baseband video signal, which is applied to an adaptive deghosting filter 642. Unit 650 responds to the detected baseband video signal for producing a control signal indicating the presence of the test line containing the PRN sequence test signal. The control signal may be developed by any of the embodiments shown in FIGS. 1, 3 or 4. The control signal enables a line selector, also included in unit 650, to pass the test line to a coefficient calculator 655. Coefficients calculated by unit 655, as discussed in U.S. Pat. No. 5,065,242, modify the response of filter 642 so as to reduce or eliminate image ghosts in the VIDEO OUTPUT signal. This signal is afterwards subjected to processing by conventional television receiver image signal processing networks.

What is claimed is:

1. In a television signal receiver including means for reducing multipath components in a transmitted television signal including a test signal component comprising a repetitive sequence of mutually correlated data groups, apparatus comprising:
   delay means responsive to a video signal component of said television signal prior to processing by said multipath reducing means for providing a delayed video signal, said delay means exhibiting a delay which is a function of an interval encompassing a data group of said test signal;
   correlation detecting means providing signal-to-signal correlation, said correlation detecting means having first and second inputs for respectively receiving said delayed video signal and said video signal, for providing and output control signal representing the amount of correlation between said video signal and said delayed video signal; and
   means for coupling said output control signal from said correlation detecting means to said means for reducing multipath components.

2. Apparatus according to claim 1, wherein
   said test signal comprises a sequence of pseudorandom number sequences, each sequence corresponding to a data group;
   said multipath reducing means includes an adaptive filter and means for generating coefficients in response to the condition of said test signal to configure said filter for reducing said multipath components; and
   said multipath reducing means further includes a line selector enabled by said control signal to pass a line containing said test signal to said coefficient generating means.

3. Apparatus according to claim 1, wherein
   said test signal occurs during an active portion of a horizontal line within a vertical blanking interval.

4. Apparatus according to claim 1, wherein
   said correlation detecting means provides a product-type output.

5. Apparatus according to claim 4, wherein said coupling means comprises:
   switch means having first and second signal inputs, a position control input, and an output;
   a first device with negative gain having an input for receiving a first signal, and an output coupled to said first input of said switch means;
   a second device with a positive gain having an input for receiving a second signal, and an output coupled to said control input of said switch means; and
   means for coupling said first signal to said first input of said switch means.

6. Apparatus according to claim 1, and further including
   means for rendering said video signal applied to said second input of said correlation detecting means substantially devoid of average and DC components.

7. Apparatus according to claim 1 and further including
means for rendering said delayed video signal applied to said first input of said correlation detecting means substantially devoid of average and DC components.

8. Apparatus according to claim 1 and further including
means for rendering both said video signal and said delayed video signal applied to inputs of said correlation detecting means substantially devoid of average and DC components.

9. Apparatus according to claim 1, wherein
said delay is substantially equal to an interval encompassing a single data group of said test signal.

10. Apparatus according to claim 1, wherein
said delay is substantially equal to an interval encompassing more than one data group of said test signal.

11. In a television signal receiver including means for reducing multipath components in a transmitted television signal including a test signal component comprising a repetitive sequence of mutually correlated data groups, apparatus comprising:
delay means responsive to a video signal component of said television signal for providing a delayed video signal, said delay means exhibiting a delay which is a function of an interval encompassing a data group of said test signal;
correlation detecting means having first and second inputs for respectively receiving said delayed video signal and said video signal, for providing an output signal representing the amount of correlation between said video signal and said delayed video signal; and
means for coupling said output signal from said correlation detecting means to said means for reducing multipath components; wherein
said correlation detecting means is a signal multiplier; and
said coupling means includes means for integrating said output signal from said correlation detecting means.

12. In a television signal receiver including means for reducing multipath components in a transmitted television signal including a test signal component comprising a repetitive sequence of mutually correlated data groups, apparatus comprising:
delay means responsive to a video signal component of said television signal for providing a delayed video signal, said delay means exhibiting a delay which is a function of an interval encompassing a data group of said test signal;
correlation detecting means having first and second inputs for respectively receiving said delayed video signal and said video signal, for providing an output signal representing the amount of correlation between said video signal and said delayed video signal; and
means for coupling said output signal from said correlation detecting means to said means for reducing multipath components; wherein
signals applied to said correlation detecting means exhibit a bandwidth less than the bandwidth of a television signal channel.

13. In a television signal receiver responsive to a transmitted television signal containing a test component comprising a predetermined repetitive sequence of data groups occupying prescribed intervals and exhibiting mutual correlation, apparatus comprising:
signal-to-signal correlation detection means responsive to said television signal and to a delayed version of said television signal for developing a control signal representing the presence of said mutual correlation; and
means responsive to said television signal and to said control signal for reducing multipath components of said television signal.

* * * * *